(12) United States Patent
Wadhwa

(10) Patent No.: US 7,526,722 B2
(45) Date of Patent: Apr. 28, 2009

(54) SYSTEM AND METHOD FOR PROVIDING USER HELP ACCORDING TO USER CATEGORY

(75) Inventor: Gaurav Wadhwa, Narnaul (IN)

(73) Assignee: SAP AG, Walldorf (DE)

( * ) Notice: Subject to any disclaimer, the term of this patent is extended or adjusted under 35 U.S.C. 154(b) by 394 days.

(21) Appl. No.: 11/319,418

(22) Filed: Dec. 29, 2005

(65) Prior Publication Data

US 2007/0157092 A1 Jul. 5, 2007

(51) Int. Cl.
*G06F 3/00* (2006.01)
(52) U.S. Cl. .................. 715/707; 715/705; 715/708
(58) Field of Classification Search .......... 715/705, 715/707, 708; 706/11
See application file for complete search history.

(56) References Cited

U.S. PATENT DOCUMENTS

| | | | | | |
|---|---|---|---|---|---|
| 4,964,077 | A | * | 10/1990 | Eisen et al. ............... | 715/707 |
| 5,103,498 | A | * | 4/1992 | Lanier et al. .............. | 706/58 |
| 5,263,167 | A | * | 11/1993 | Conner et al. ............. | 707/4 |
| 5,311,422 | A | * | 5/1994 | Loftin et al. .............. | 703/2 |
| 5,432,940 | A | * | 7/1995 | Potts et al. ................ | 719/320 |
| 5,485,544 | A | * | 1/1996 | Nonaka et al. ............ | 706/11 |
| 5,513,308 | A | * | 4/1996 | Mori ....................... | 715/707 |
| 5,634,086 | A | * | 5/1997 | Rtischev et al. ........... | 704/270 |
| 5,727,950 | A | * | 3/1998 | Cook et al. ............... | 434/350 |
| 5,774,118 | A | * | 6/1998 | Hatakama ................. | 715/707 |
| 6,005,569 | A | * | 12/1999 | Breggin .................... | 715/711 |
| 6,014,134 | A | * | 1/2000 | Bell et al. ................. | 715/705 |
| 6,275,227 | B1 | * | 8/2001 | DeStefano ................ | 369/30.01 |
| 6,341,359 | B1 | * | 1/2002 | Aiken et al. .............. | 714/100 |
| 6,356,859 | B1 | * | 3/2002 | Talbot et al. .............. | 702/188 |
| 6,452,607 | B1 | * | 9/2002 | Livingston ............... | 715/705 |
| 6,466,897 | B1 | * | 10/2002 | Yoshida ................... | 702/186 |
| 6,542,163 | B2 | * | 4/2003 | Gorbet et al. ............. | 715/711 |
| 6,556,974 | B1 | * | 4/2003 | D'Alessandro ........... | 705/10 |
| 6,597,314 | B1 | * | 7/2003 | Beezer et al. ............. | 715/812 |
| 6,633,742 | B1 | * | 10/2003 | Turner et al. ............. | 434/350 |
| 6,718,490 | B1 | * | 4/2004 | Takemoto et al. ........ | 714/47 |
| 6,801,751 | B1 | * | 10/2004 | Wood et al. .............. | 434/362 |
| 6,944,624 | B2 | * | 9/2005 | Orton et al. .............. | 707/102 |
| 7,001,183 | B2 | * | 2/2006 | Dowrick ................... | 434/178 |

(Continued)

FOREIGN PATENT DOCUMENTS

JP 02021320 A * 1/1990

(Continued)

OTHER PUBLICATIONS

"How to Use Microsoft Windows XP" by Walter Glenn, published by Pearson Education inc. in 2002, pp. i, ii, 184, 185.*

*Primary Examiner*—Rachna S Desai
*Assistant Examiner*—Gregory A DiStefano
(74) *Attorney, Agent, or Firm*—Kenyon & Kenyon LLP

(57) ABSTRACT

In a system and method for providing user help information, based on a user history, a user proficiency category may be determined, at a point during execution of a sequence of program instructions, it may be determined based on the user proficiency category whether to output a portion of stored user help information that is, in particular, associated with the point in the execution, and based on the latter determination, the portion may be automatically provided without receiving a request for user help information.

21 Claims, 2 Drawing Sheets

U.S. PATENT DOCUMENTS

| | | |
|---|---|---|
| 7,107,261 B2 * | 9/2006 | Farrett .......................... 707/3 |
| 7,272,793 B2 * | 9/2007 | Mutsuno et al. ............. 715/707 |
| 7,292,990 B2 * | 11/2007 | Hughes ........................ 705/9 |
| 2001/0034742 A1 | 10/2001 | Stinson |
| 2002/0015056 A1 * | 2/2002 | Weinlaender ............... 345/705 |
| 2003/0030668 A1 | 2/2003 | Morrison |
| 2003/0099924 A1 * | 5/2003 | Tsuboi et al. ............... 434/350 |
| 2003/0125924 A1 * | 7/2003 | Lines et al. .................. 703/20 |
| 2004/0006475 A1 | 1/2004 | Ehlen et al. |
| 2004/0015329 A1 * | 1/2004 | Shayegan et al. ........... 702/179 |
| 2004/0036715 A1 * | 2/2004 | Warren ....................... 345/713 |
| 2005/0177373 A1 * | 8/2005 | Cooper et al. ............... 704/275 |
| 2006/0168335 A1 * | 7/2006 | Hodjat et al. ............... 709/239 |
| 2007/0027733 A1 * | 2/2007 | Bolle et al. .................... 705/7 |

FOREIGN PATENT DOCUMENTS

| | | | |
|---|---|---|---|
| JP | 04291415 A | * | 10/1992 |
| JP | 07284034 A | * | 10/1995 |
| JP | 10021037 A | * | 1/1998 |
| JP | 2000137726 A | * | 5/2000 |
| JP | 2000330683 A | * | 11/2000 |

* cited by examiner

SYSTEM AND METHOD FOR PROVIDING USER HELP ACCORDING TO USER CATEGORY

BACKGROUND

Computer applications include a vast number of features, many of which require a user to perform a complicated set of steps. Performance of such steps is often not intuitive and a user therefore often does not perform the correct steps, therefore failing to accomplish a task the user intended to perform and/or causes an error.

It is conventional to provide a database of user help information so that when the user encounters an error or determines that the user requires instruction on how to proceed, the user may retrieve pertinent information from the database.

It is conventional to display user help information in response to a user request for help. This requires the user to spend time searching for the correct help topic and distracts the user from the actual performance of the tasks the user intended to perform.

It is also conventional to provide user help information in response to an action performed by a user in error. This causes time to be wasted since it requires the user to perform the action multiple times, until the user performs the action correctly. Furthermore, the user often is provided with the help information for a particular action after the user's attention is already directed to a different action, thereby causing confusion and hesitation. For example, it often occurs that a user enters data in a number of fields of an electronic form and, after all fields are filled, clicks "submit." The error is detected and user help information is provided after the user clicks "submit." If the error relates to one of the first fields of the form, by the time the user receives the user help information, the user's attention is no longer directed to the field and the data required for the field. Furthermore, a user often does not know how to perform a certain action and therefore makes no attempt to do so. In this instance, no error occurs, but the user nevertheless requires help which is not provided.

It is also conventional to provide user help information to help a user perform an action even before an attempt by the user to do so. For example, instructions are often displayed near a field indicating the type of information the user is to enter into the field, and/or instructions are often displayed indicating steps to be taken by the user to perform a variety of possible actions. However, to display all such possible user help instructions clutters the display, often distracting the user from the essential data displayed on the page.

Thus, there is a need in the art for a system and method that selectively and automatically provides user specific help information based on a user history.

DETAILED DESCRIPTION

Embodiments of the present invention relate to a computer system and method that provide user specific help information, where the provision of the user help information is not made in response to a request for user help or in response to an error event. Embodiments of the present invention relate to a computer system and method that may selectively provide user help information based on a user proficiency category. The user proficiency category may be determined based on a user history and/or may be selected by the user. The user history may indicate, for example, particular operations performed by a particular user, a number of times the operations were performed, particular portions of a collection of user help information previously requested by the user and/or provided to the user, and/or particular problems, actions, and/or errors associated with the user. A problem may be indicated when a user fails to act in a manner, intent of performance of which it is determined is highly probable. An action may be indicated when it is determined that the user has performed in a manner that does not produce an error, but does not allow for completion of a task. For example, for completion of a task it may be required that the user enter a number amount in a particular field. While it may be that no error occurs when the user enters data other than a number amount, if the user later attempts to perform the task for which the number amount was required, the user history may indicate as an error the occurrence of the previous action of entering data other than a number amount. An error may be indicated when an error results from the user's action. Particular portions of the user help information may be provided because of the association of the association of the user help information with the user's proficiency category.

Figure 1:
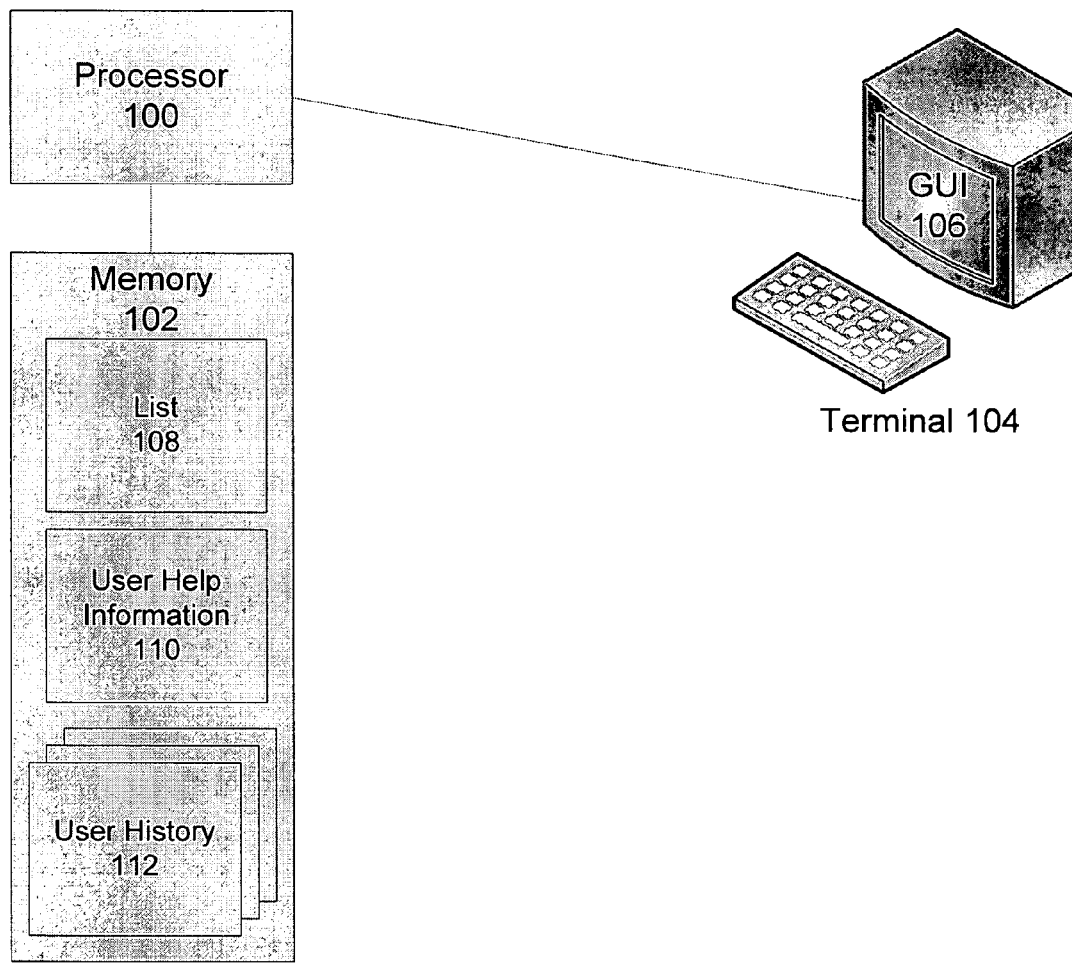
FIG. 1 is a block diagram that illustrates example components of a system according to an example embodiment of the present invention.

FIG. 1 is a block diagram that illustrates example components of a system according to an example embodiment of the present invention. A processor 100 may execute one or more sets of program instructions stored in a memory 102. The particular instructions executed by the processor 100 may depend on input provided by a user via an input device, e.g., a keyboard, a mouse, a touch pad, or any other conventional input device. The input device may be, e.g., at a terminal 104. At the terminal 104 may be an output device, e.g., a graphical user interface (GUI) 106. Output obtained during execution of the program instructions may be provided to the user via the output device. For example, the processor 100 may provide data for generating a display at the GUI 106 including the obtained output.

For one or more program instruction sets that may be executed by the processor 100, there may be stored a list 108 of problems, actions, and/or errors that may occur during execution of the program instruction sets. Which of the list 108 occur may depend on user input. For each problem, action, and/or error of the list 108 may be stored a corresponding solution in a set of user help information 110. For example, the list 108 may include for each entry in the list 108 a pointer to a corresponding solution in the set of user help information 110. Any conventional manner of linking data may be used. While FIG. 1 illustrates the list 108 and set of user help information 110 as separate data entities, such that linking of particular solutions to particular problems, actions, and/or errors is required, e.g., by pointers, it will be appreciated that the list 108 and set of user help information may be combined into a single data entity. For example, they may be combined into a single flat file. It will also be appreciated that a single problem, action, or error is not limited to one pointer. For example, for a particular problem, action, or error, a combination of two or more solutions, e.g., which may each be used separately for other problems, actions, and/or errors, may be appropriate. In this instance, the list 108 may include two or more corresponding pointers for the particular problem, action, or error. Further, a particular problem, action, or error may correspond to alternative solutions or solution combinations. Which alternative is used for the particular problem, action, or error may depend on the point in the sequence of program steps during which the event occurs, and/or may depend on the proficiency category of the user for whom the solution or solution combination is to be provided. (It will be appreciated that a sequence of program instructions need not be written in sequence in a program, but may include jumps and interrupts.) For example proficiency categories may include a "beginner," "intermediate," and/or "advanced" proficiency category. It will be appreciated that any number of proficiency categories may be included.

Each problem, action, and/or error of the list 108 may be uniquely identified. For example, the identification may be by an assigned identification number, a memory address at which it is listed, or any other conventional way in which to uniquely identify a particular stored data element. Further, in one example embodiment, multiple entries may be provided for a single event, where each separate entry is for a different event/solution and/or event/user-category combination.

For a user, a corresponding user history 112 may be stored. The user history 112 may identify particular problems, actions, and/or errors listed in the list 108 that have occurred while the user was logged into the system. For example, the user history 112 may identify the events with memory address pointers or with unique identification numbers of the event. When the problem, action, and/or error occurs, the system may update the user history 112 to include an identification of the encountered problem, action, and/or error. Further, the user history 112 may identify the particular point within a sequence of executed program instructions at which time the event occurred. This may be pertinent because occurrence of a same event at different points may imply different information regarding the user's proficiency. The user history 112 may also include information regarding the number of times the system was used by the user, which may be based on the number of log-ins by the user, and/or the number of times the user used particular features of the system. A non-exhaustive list of additional information that may be stored in the user history 112 is a number of times a particular event has occurred, a date and/or time of the occurrence of the event, a particular application and/or portion thereof or display used by the user at the time of the occurrence of the event and to which the occurrence of the event relates, a number of times the user has used the same application and/or portion thereof or display without recurrence of the event, a number of times particular portions of user help information 110 was provided to the user, and/or information regarding the user's role, e.g., manager, clerk, etc.

A plurality of user histories 112 may be stored in the memory 102, each for a different user. For example, users may log into a system that provides for access by the user to use programs. Each user may be assigned a different log-in ID. The log-in ID may be a username entered by the user during log-in. Alternatively, a plurality of terminals, which may each be uniquely identified, e.g., via a network address, may be provided with access to the system. For each username, or terminal, a corresponding user history 112 may be stored.

During execution of program instructions, the system may determine, based on a user history 112 associated with a logged in user, whether to output a portion of the user help information 110. For example, the system may determine from the user history 112 a category of proficiency associated with the user. The system may determine the proficiency category on the fly in order to determine whether to output the portion of user help information 110, or may determine the proficiency category at predetermined times, e.g., at log-in or at predetermined intervals. In either case, the system may determine the proficiency category based on information of the user history 112.

At predetermined points in a sequence of executed instructions, the instructions, when executed, may cause the system to determine whether to output to the user one or more portions of the user help information 110 associated with particular events of the list 108. In particular, the system may make this determination so that it may output the relevant user help information 110 at a point in the execution of the program that is before the point at which an event, for aiding in the avoidance of which the user help information 110 is intended, might occur or often occurs. For example, the event or user help information may be associated with required user data entry into an electronic form displayed in response to program instructions the processor 100 is currently executing. The form may include fill-in fields that require particular types of data, such as a number, a date, etc. The user history 112 may indicate that the user is a "beginner." It may be determined that beginners require help information 110 indicating required data types. Accordingly, when the form is displayed, the system may provide instructions indicating the types of data required for the fields of the form prior to entry by the user of data into the data fields of the form.

The system may make the determination whether to output user help information 110 for different listed events depending on the point in the sequence of executed instructions at which the determination is made. A first event may be pertinent to the point in the sequence, while a second event might not be. Multiple events may be associated with a particular portion or display of an application. Accordingly, a number of determinations whether to provide user help information 110 may be made consecutively at a point in the sequence of executed instructions, each determination for a different event. Whether or not the system determines to output the portion of the user help information associated with the event may depend on whether the event is associated with a user proficiency category that matches that of the user. If there is a match, then the system may provide the relevant user help information 110, and otherwise may refrain from doing so. Some events, even with respect to a particular point in the sequence of executed instructions, may be associated with one, two, or more, or all user proficiency categories.

In an embodiment of the present invention, the system may determine a user's proficiency category based on the number of times the user has used the system. The user history 112 may indicate the number of times the user has logged in. The more times the user logs in, the more advanced the user may be deemed to be. After a predetermined number of log-ins, the system may update the user's proficiency category to a more advanced level. For example, after a single log-in, the user's proficiency category may be determined to be "beginner," and may be increased to "intermediate" after 10 log-ins. In one example embodiment, the date and/or time of the user's last log-in may be recorded in the user history 112. If it is determined that a predetermined amount of time has passed between log-ins, the system may decrement the recorded number indicating the times the user has logged in. The amount by which the number is decremented may depend on the amount of time that passes between log-ins.

In an alternative embodiment, the system may determine the user's proficiency category based on a number of times the user has encountered any of the events of the list 108. Alternatively, the number of different ones of the listed events encountered by the user may be considered. Accordingly, the system may deem a user to be "advanced" at first, even at a first log-in, but may gradually demote the user to a less advanced proficiency category. The user history 112 may also indicate for a previously encountered event, an amount of time that has passed since occurrence of the event, a number of log-ins after occurrence of the event, and/or a number of times the user has revisited the point in the sequence of executed instructions at which the event had previously occurred without recurrence of the event. As time passes, the number of log-ins increases, and/or the number times the user has revisited the point in the execution sequence increases without recurrence of the event, the user's proficiency category may be advanced.

In an alternative embodiment, the system may determine the user's proficiency category based on the particular events that the user history 112 indicates have occurred. For example, it may be determined that while a "beginner" often encounters problem 'x', an advanced user usually does not encounter problem 'x'. Accordingly, if the user history 112 indicates that the user did encounter problem 'x', the system may determine that the user is a "beginner." As time passes, the number of log-ins increases, and/or the number of times the user has revisited the point in the execution sequence at which point problem 'x' occurred increases without recurrence of problem 'x', the user's proficiency category may be advanced. It may be required for a predetermined number of "beginner" problems to be associated with a user, for the user to be deemed a "beginner." The particular events that imply that a user is of a particular category may be predetermined. Alternatively, the particular events may be changed overtime. For example, if it is indicated in a plurality of user histories 112, each associated with a different user, but all determined to be "advanced" users, that all of the "advanced" users with whom the user histories 112 are associated have encountered what was previously categorized as a "beginner" problem, the system may re-categorize the problem as an "advanced" problem.

In an example embodiment of the present invention, the system may use a combination of the above factors to determine a user's proficiency category. For example, each of the above factors may be assigned a certain weight, to obtain a weighted average. The weighted average may be ultimately used to determine the user's proficiency category.

In an example embodiment of the present invention, for indicating the events encountered by a user, the user history 112 may include a table including a list of the events of the list 108, or a list of events that are each associated with one or more events of the list 108, and for each event of the user history 112, the user history 112 may indicate whether the event has occurred. It is noted that the events listed in the user history 112 need not correspond exactly to the list 108. For example, a particular event listed once in the list 108 may be listed as multiple entries in the user history 112, each entry being for a different part of a program with which the event may be associated.

In an example embodiment of the present invention, a user may be assigned a plurality of proficiency categories, each for different aspects of the system. For example, a user may be deemed to be "advanced" with respect to the system generally, but a "beginner" with respect to the use of certain applications of the system. The system may assign a user to proficiency categories according to any degree of specificity of applications or operations of applications. Accordingly, the determination as to whether to output a portion of the user help information 110 relating to a particular event at a particular point in the sequence of execution of instructions, may be dependent on the user's proficiency category with respect to the particular point in the sequence of the execution of instructions at which the determination is made. It may also depend on the particular event for which the determination is made. For example, if the event is related in particular to the point in the execution sequence, then the determination may be based on the category associated with the point in the execution sequence, but if the event is related to the system in general, then the determination may be based on the category associated with the system in general.

In an embodiment of the present invention, the particular portions of the user help information 110 provided to users of particular proficiency categories may be predetermined. Alternatively, while there may be such default settings, they may be changed over time, either in response to user settings or automatically. For example, if it is determined that many "advanced" users encounter a particular problem for which the relevant user help information 110 was output only for "beginners," the system may change the settings so that the user help information 110 is output also for "advanced" users.

In one example embodiment, different users may be assigned different roles. The user history 112 may identify a user's role. The particular portion of the user help information 110 provided for instruction regarding a particular event may vary depending on the user's identified role. For example, the user history 112 and the method of providing user help information 110 based on the user history 112 may be provided for a company portal. Company employees may log into the portal. A user history 112 may be maintained for each company employee, and may identify the employee's role in the company. The steps to be taken at a particular point in program execution within the portal may depend on the user's role. For example, a supervisor may be able to and/or required to enter different information than a lower level employee. Accordingly, an example difference regarding the user help information 110 provided depending upon user role may be that for avoiding an event pertaining to the entering of incorrect information, the system and method may provide instructions to a first user to enter a first kind of information and to a second user to enter a second kind of information. Further, even if the same information is pertinent to both users, whether the information is output may depend on the user's role. For example, the degree of pertinence may vary depending on role. Another example is that it may be determined that users having different roles may be expected to have different degrees of proficiency with respect to particular aspects of the system. Accordingly, the role may be a factor for determining the user's proficiency category.

Further, whether what occurs is detected by the system and entered into the user history 112 as a problem, action, and/or error event (for determining the user's proficiency category) may depend on the user's role. For example, at a particular point during program execution, entry by the user of particular data may be detected as such an event if the user's role is a first role for which different data was expected, but not if the user's role is a second role for which the entered data was expected.

In one example embodiment, the system may provide the user help information 110 all times the user encounters the part of the system with which the event corresponding to the user help information 110 is associated, as long as it is determined that the user's proficiency category warrants output of the user help information 110. In an alternative example embodiment, the system may provide the user help information 110 only once based on the user category determination. Which of the user help information 110 has been provided to a user may be recorded in the user's user history 112. If the user help information 110 has been previously provided, the system may refrain from again outputting the user help information 110. In one example embodiment, the system may refrain from again outputting the user help information 110 as long as the user does not encounter the event for the prevention of which the user help information was provided. If the event does occur, the user history 112 may be updated to clear the indication that the user help information 110 had been previously output. Accordingly, the system may again display the user help information 110 when relevant, unless the user's category has been advanced.

For example, after output of the relevant portion of the user help information 110, the system may update the user history 112 to indicate that it has been output. If the event occurs, the relevant user help information 110 may be displayed in response thereto, as in conventional systems. Further, the system may reset the entry in the user history 112 indicating previous output of the user help information 110, so that it would again be output based on the user category determination. According to another embodiment, there may be a counter set to a predetermined or user input number when the help information 110 is output based on the user category determination. The counter may be, for example, decremented each time the user help information 110 is output based on the user category determination. The user help information 110 may be provided each time the user category determination is made until the counter reaches zero. If the event for which the user help information 110 is provided occurs, the counter may be reset.

In one example embodiment, instead of, or in addition to, providing user help information based on the user category when the relevant part of a program is executed, the system may provide the user-specific portions of the user help information 110 as soon as the user logs into the system. For example, a user-specific help manual may be generated, in addition to the general help manual which may be accessed by any user. The user-specific help manual may be output in response to a request therefor. For example, an icon for the user-specific help manual may be generated and displayed for selection by the user for requesting the user-specific help manual. Alternatively, the user-specific help manual may be immediately output when the user logs into the system even without a request therefor.

In one example embodiment, the system may display the user-specific help manual at log-in only if the user had previously logged off of the system without completing a task the user had begun and with which at least a portion of the user-specific help manual is associated. Similarly, in an embodiment in which the system does not provide the user-specific help manual that includes user help information 110 associated with all events associated with the user's user category, but instead provides only user help information 110 associated with events corresponding to a currently executed portion of a program, the system may provide at log-in user help information 110 associated with an event corresponding to the task that had been previously begun but not completed.

Figure 2:
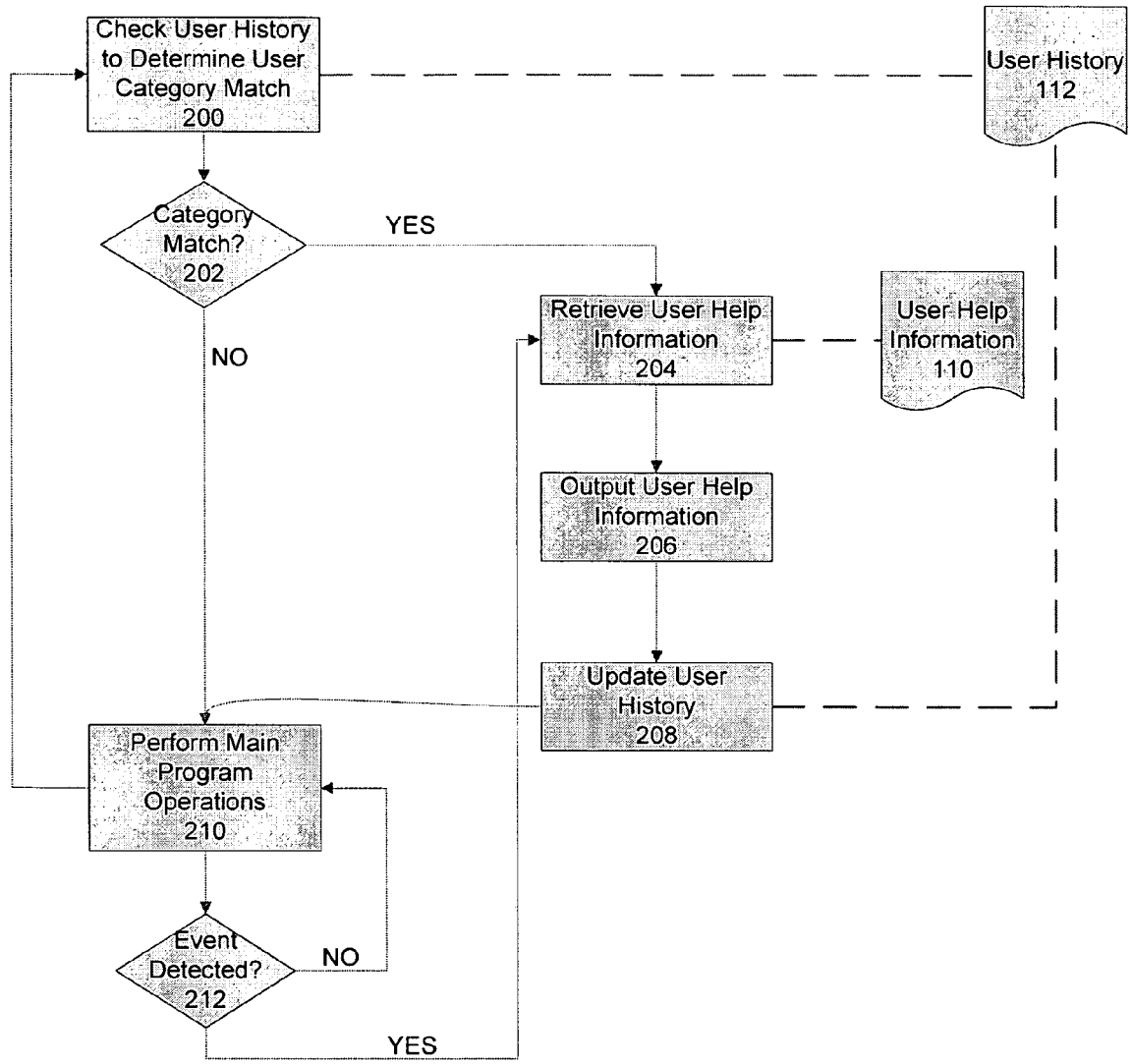
FIG. 2 is a flowchart that illustrates an example procedure that may be performed according to an example embodiment of the present invention.

FIG. 2 is a flowchart that shows an exemplary sequence of a procedure that may be executed according to an embodiment of the present invention. When a program is first loaded for execution, for example, at log-in, the system may, at 200, check the user history 112 to determine whether the user's proficiency category matches the proficiency category for which there is to be provided any user help information 110 associated with an event that pertains to the current point in instructions execution. At 202, the system may make this determination based on the data of the user history 112 obtained at 200. As discussed above, step 202 may include calculating the user's proficiency category based on information stored in the user history 112. Alternatively, the proficiency category calculation may be made at a different time and recorded in the user history 112, in which case, at 202, the system may use the recorded proficiency category to determine the match. If it is determined that there is a match, the system may, at 204, retrieve relevant user help information 110, and output the retrieved information at 206.

At 208, the system may update the user history 112. For example, as discussed above, the system may update the number of times the user help information has been output based on the category match. At 210, the system may perform the main program operations. At predetermined intervals or at predetermined points of program execution, the system may return to 200 to check the user history 112 to determine a user category match for outputting relevant user help information 110.

During execution of the main program operations, the system may detect, at 212, whether an event associated with user help information 110 has occurred. If an event is detected at 212, the system perform 204 to 208 and return to 210 to continue performance of the main program instructions. At 204, after detection of an event at 212, the system may retrieve user help information 110 associated with the detected event for output at 206. At 208, after detection of an event at 212, the system may update the user history 112 to indicate the occurrence of the event and/or other information as discussed above. Additionally, although not shown in the sequence illustrated in FIG. 2, 208 may be performed after each step or after particular step performed since log-in or for particular tasks to record the steps taken by the user. The relevance of this information is discussed above.

Consider the foregoing embodiments as applied to an exemplary installation in which the system provides for the management of Purchase Orders (P.O.). The system may aid in the performance of tasks that require the user to perform a number of steps. For example, the system may aid the user in generating and sending out a P.O. A required step may be to select a P.O. form type. For example, different P.O. forms may be used depending on the suppliers for which the P.O.s are intended. A required step may be to select a particular supplier. A required step may be to select a preferred method of delivery. A required step may be to select a method by which the P.O. is to be sent to the suppliers. After performance of each of these steps, the system may update a log in the user history 112 to indicate the step's performance. If, for example, the user has entered all required information so that the P.O. is ready to be sent, but the user has not selected a method by which the P.O. is to be sent, the system may detect that the user does not realize that it is required for the user to perform this step, or does not know how to do so. In response to this detection, the system may provide to the user the portion of the user help information 110 that corresponds to this step. The system may also update the user history 112 to indicate that the event of omitting this step has occurred. Based on this indication, the user's proficiency category may be updated, e.g., with respect to the P.O. preparation related portions of the system and/or with respect to the system generally.

In one example embodiment, the system may detect occurrence of an event of a failure to perform if the user attempts to log out or to switch programs without performing the anticipated step. In an alternative or additional embodiment, the system may detect occurrence of the failure to perform even if the user does not log out or switch programs. For example, detection may be based on non-performance of a particular step for a predetermined amount of time that elapses. For example, as soon as the particular step may be performed, the system may start a timer. If the particular step is not performed after the predetermined amount of time elapses, the system may detect the failure to perform event. Alternatively, the system may start the timer as soon as the particular step is the only step yet to be performed for completing the started task or as soon as it is required to perform the particular step in order to proceed further with respect to completing the task. In a slight variation of the above, after the timer is started, if any step of the task, even not the particular step, is performed, or alternatively, if any step of any task is performed, the timer may be reset. It will be appreciated that there are other variations of the above described rule-sets according to which the system may detect occurrence of a failure to perform.

In one example embodiment, the system may provide user options with respect to when to display user help information 110. For example, the user may select an option for providing user help information 110 regarding a next step to be performed with respect to a particular task or all tasks, regardless of the user's proficiency category. If this option is selected, the system may refrain from checking the user history 112, since the help information 110 is to be provided regardless of a user category match. Further, the help information 110 may be provided even before a timer time out. In one embodiment, the timer may be started even if this option is selected in order to update the user history 112 in the event of a failure to perform.

According to the embodiment in which the user may be assigned multiple proficiency categories, each corresponding to different aspects of the system, it may be determined from the data recorded in the user history 112 that the user often uses an e-mail program, but does not often use the P.O. preparation program. The system may accordingly assign the user to an "advanced" category with respect to the e-mail program, but to a "beginner" category with respect to the P.O. preparation program. Accordingly, when the user uses the e-mail program, the system may determine whether to output user help information 110 based on a match to the "advanced" category, but when the user uses the P.O. preparation program, the system may determine whether to output user help information 110 based on a match to the "beginner" category. In a slight variation of this embodiment, if there is an event that is associated with general use of the system, then even during use of the P.O. preparation program, the determination whether to output the user help information 110 associated with the general system event may be made based on a match to an "advanced" category if the user is considered "advanced" with respect to the system generally.

According to the embodiment in which the system provides a user-specific help manual upon a condition that the user had previously logged off of the system without completing a task, if the user logs off of the system before completing preparation of or sending out of the P.O., and saves the P.O. for completion at a later time, then when the user logs back into the system the system may provide the user-specific help manual if it includes help information 110 related to the task.

In an example embodiment of the present invention, the system may provide user-specific help manuals that are also task specific. For example, if the user opened a number of P.O.s, and is up to a different stage for each, then the system may provide at log-in different sets of user help, each corresponding to a different one of the P.O.s. For example, if for P.O.1 the user is up to step 3 and for P.O.2 the user is up to step 5, then the system may provide a set of user help for P.O.1 that includes information related to steps 4 and on, and a set of user help for P.O.2 that includes information related to step 6 and on. All sets may be provided at log-in. Alternatively, a set of user help may be provided when the corresponding P.O. is opened. According to this embodiment, the user history 112 may include a plurality of sub-user-histories, each for a different task.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method for providing user help information, comprising:
   a processor storing information regarding a particular error, the stored information indicating that occurrence of the particular error is to be used as an indication of a first proficiency level;
   subsequent to use of a logged occurrence of the particular error as the indication of the first proficiency level, the processor updating the stored information regarding the particular error to indicate that occurrence of the particular error is to be used as an indication of a proficiency level that is more advanced than the first proficiency level;
   based on a user history and the stored information, the processor determining a user proficiency category; and
   during execution of a program, the processor automatically and selectively providing a stored user help information that instructs on avoidance of an error conditional upon that the error, on avoidance of which the user help information instructs, is associated with the determined user proficiency category.

2. The method of claim 1, wherein the user proficiency category is determined based on a calculation that uses a plurality of user history factors, each factor assigned a corresponding weight.

3. The method of claim 1, wherein the user proficiency category is determined based on at least one of a number of system log-ins, particular system features used by a user with whom the user history is associated, a number of a set of events that have occurred during operation of a system by the user, and types of events that have occurred during operation of the system by the user.

4. The method of claim 3, wherein the user proficiency category is determined based on at least the number of system log-ins, and the number of system log-ins is decremented if a predetermined amount of time passes between log-ins.

5. The method of claim 3, wherein:
   after occurrence of a particular event, the number of the set of events is incremented; and
   after at least one of passage of a predetermined amount of time from the occurrence of the particular event, a predetermined number of system log-ins after the occurrence of the particular event, and a predetermined times a point in an execution of program instructions at which the particular event occurred is revisited by operation of the user, without recurrence of the particular event, the number of the set of events is decremented.

6. The method of claim 1, wherein, based on the user history, a plurality of user proficiency categories are determined, each associated with a corresponding aspect of a system.

7. The method of claim 6, wherein, whether to provide a particular portion of the stored user help information is determined in accordance with a particular one of the plurality of proficiency categories that is associated with a point in program execution at which the determination regarding whether to provide the particular portion is made.

8. The method of claim 6, wherein, whether to provide a particular portion of the stored user help information is determined in accordance with a particular one of the plurality of proficiency categories that is associated with an aspect of the system with which is associated an event for which the determination is made.

9. The method of claim 1, wherein the portion is provided upon a condition that the user history does not indicate a previous provision of the portion that was in accordance with the user proficiency category, further comprising:
responsive to providing the portion, updating the user history to indicate the previous provision of the portion.

10. The method of claim 9, wherein the error, on avoidance of which the user help information instructs, is associated with the determined proficiency category independent of occurrence of the error, the method further comprising:
clearing the indication in the user history of the previous provision of the portion upon occurrence of the error, on avoidance of which the user help information instructs.

11. The method of claim 1, farther comprising:
providing a portion of the stored user help information that is associated with a task responsive to log-in by a user conditional upon that a user history associated with the user indicates that that user previously logged-off without completing the task.

12. A tangibly-embodied computer-readable medium having stored thereon instructions adapted to be executed by a processor, the instructions which, when executed, cause the processor to perform a method for providing user help information, the method comprising:
storing information regarding a particular error, the stored information indicating that occurrence of the particular error is to be used as an indication of a first proficiency level;
subsequent to use of a logged occurrence of the particular error as the indication of the first proficiency level, updating the stored information regarding the particular error to indicate that occurrence of the particular error is to be used as an indication of a proficiency level that is more advanced than the first proficiency level;
based on a user history and the stored information, determining a user proficiency category; and
during execution of a program, automatically and selectively providing a stored user help information that instructs on avoidance of an error conditional upon that the error, on avoidance of which the user help information instructs, is associated with the determined user proficiency category.

13. A computer-implemented method for providing user help information, comprising:
during each of a first and a second execution of a sequence of program instructions, in response to reaching a predetermined point in the execution, a processor automatically determining whether to output, of a stored user help information, a portion that includes instructions regarding how to avoid occurrence of an event at one of the predetermined point and a point in the sequence proximal to the predetermined point, wherein, during the first execution, the event is associated with a first proficiency category; and
subsequent to the first execution, the processor updating, based on a plurality of user histories, stored information regarding the event, the updated information associating the event with a second proficiency category;
wherein:
during the first execution, the portion is determined to be provided conditional upon that a user proficiency category, determined based on a respective one of the user histories associated with the first execution, is the first proficiency category;
during the second execution, the portion is determined to be provided conditional upon that a user proficiency category, determined based on a respective one of the user histories associated with the second execution, is the second proficiency category.

14. The method of claim 13, further comprising:
compiling, for each of at least one of the respective user histories, a user-specific help manual that includes, of the stored user help information, only portions that are associated with the respectively determined user proficiency category.

15. The method of claim 14, further comprising:
for each of the at least one of the respective user histories, automatically displaying the respective user-specific help manual in response to a log-in by a user associated with the respective user history.

16. The method of claim 14, further comprising:
for each of the at least one of the respective user histories, displaying a selectable icon, selection of the icon being interpreted as an instruction to display the respective user-specific help manual.

17. The method of claim 14, wherein, for one of the at least one of the respective user histories, a plurality of user-specific help manuals are compiled, each corresponding to a different one of a plurality of stored tasks, wherein the portions included in a particular one of the user-specific help manuals depends on the task to which the particular user-specific help manual corresponds, the method farther comprising:
in response to an operation to open a particular one of the stored tasks, providing the user-specific help manual corresponding to the particular task.

18. The method of claim 13, wherein:
the user histories include an indication of a user role; and
the user proficiency categories depend on the indicated user role.

19. The method of claim 18, wherein, whether occurrence of a particular event is logged in a user history depends on a user role indicated by the user history.

20. The method of claim 13, wherein the user proficiency categories determined based on the respective user histories are user-electable.

21. The method of claim 13, wherein a failure to perform an anticipated action is logged in one of the user histories as an error.

* * * * *